United States Patent [19]

Uemura et al.

[11] 4,025,274
[45] May 24, 1977

[54] APPARATUS AND PROCESS FOR PREPARING THERMOPLASTIC RESIN COMPOSITION

[75] Inventors: Masaru Uemura; Tadashi Kasamatsu; Toshimitsu Akiyama, all of Tokyo; Hitoshi Kuroki, Yokohama; Yujiro Kosaka, Yokosuka, all of Japan

[73] Assignees: Toyo Soda Manufacturing Co., Ltd.; Tadashi Kasamatsu, Tokyo, both of Japan

[22] Filed: May 21, 1976

[21] Appl. No.: 688,568

[30] Foreign Application Priority Data

Oct. 24, 1975 Japan ............................ 50-127355
Oct. 24, 1975 Japan ............................ 50-127359
Oct. 24, 1975 Japan ............................ 50-127364
Oct. 24, 1975 Japan ............................ 50-127365

[52] U.S. Cl. .................. 425/376 B; 264/176 R; 264/349
[51] Int. Cl.² ................................ B29F 3/01
[58] Field of Search .......... 425/376, 461, 190, 191, 425/461; 264/349, 176 R

[56] References Cited

UNITED STATES PATENTS

| 2,632,203 | 3/1953 | DeLaubarede | 264/349 |
| 3,745,200 | 7/1973 | Geyer | 425/376 R |

Primary Examiner—Richard B. Lazarus
Attorney, Agent, or Firm—Oblon, Fisher, Spivak, McClelland & Maier

[57] ABSTRACT

The present invention is concerned with a method and apparatus which blend components of a thermoplastic resin composition in an extruder having a cylindrical body, a screw, and a heating means, wherein the cylindrical body has a large bore part, a tapered part, and a small bore part, and the screw has a large diameter flight, a tapered flight, and a small diameter flight which is fitted within the cylindrical body. The tapered flight has free pass recesses, if desirable, and the roughness of the inner surface of the cylindrical body and/or roughness of the outer surface of the flight of screw are decreased as one proceeds in the direction from the small bore part to the outlet.

16 Claims, 28 Drawing Figures

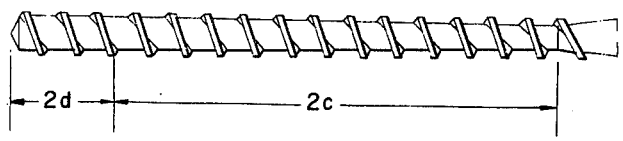
FIG. 5
FIG. 6a   FIG. 6b
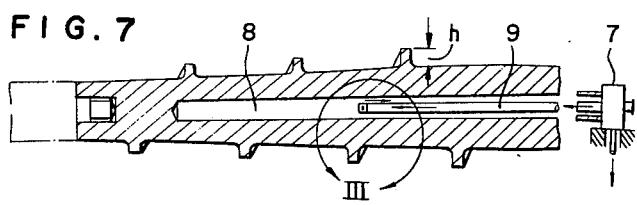
FIG. 7
FIG. 8   FIG. 9
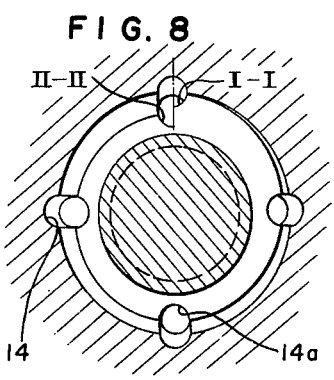
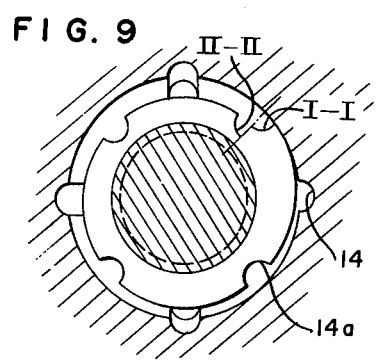
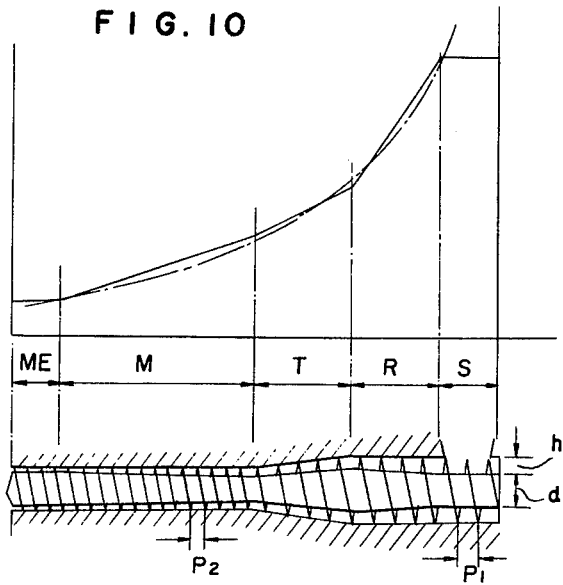
FIG. 10

(A) 
(B)

(A) 
(B)

(A) 
(B)

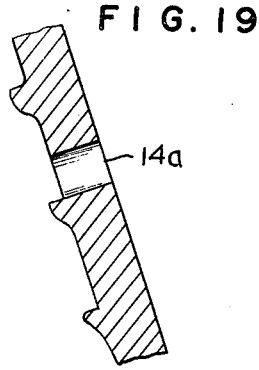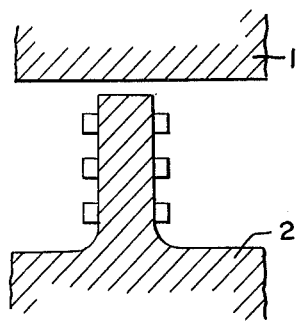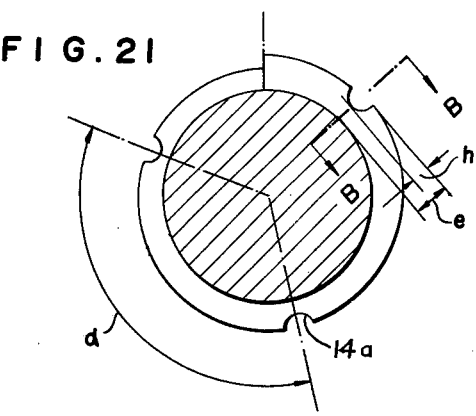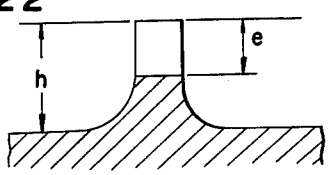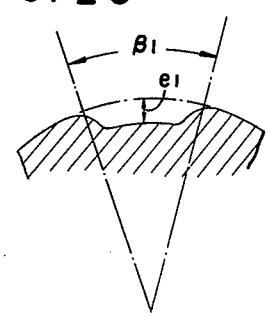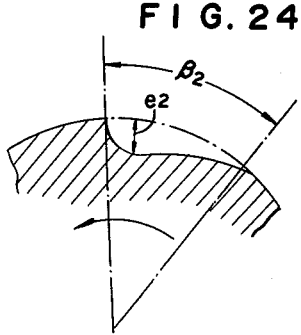

4,025,274

APPARATUS AND PROCESS FOR PREPARING THERMOPLASTIC RESIN COMPOSITION

BACKGROUND OF THE INVENTION

1. Field of the Invention:

The present invention relates generally to an extrusion method and apparatus, and more particularly, to an apparatus and process for preparing a thermoplastic resin composition such as a hot melt composition.

2. Description of the Prior Art:

Heretofore, uniaxial screw type extruders have been employed which extrude molten thermoplastic resins. However, in the blending of two or more components, it is not sufficient to merely blend the components in a conventional uniaxial screw type extruder, and there is an increased need for thermoplastic resin compositions, such as hot melt compositions. However, it is impossible to prepare such thermoplastic resin compositions especially hot melt compositions, by employing the conventional extruders because of the low blendability or slip of the molten thermoplastic resin.

Accordingly, thermoplastic resin compositions, such a hot melt compositions, have been prepared by melting raw materials in a heated kneader equipped with a stirrer, and then extruding the mixture through a heated tube by means of a pump. A large-sized apparatus has been employed, and thermal deterioration of the components of the compositions have occurred because of the long term heating processes involved.

An example of a conventional extruder useful for extruding thermoplastic resin compositions is one which comprises a hopper, a melting cylinder, a cylinder heating mechanism, and a screw portion in the cylinder. When the extruder is used to extrude a low viscosity resin composition, such as a hot melt composition, the molten composition slips into the cylinder through means of a screw which rotates in the cylinder, however, complete mixing, kneading and extruding of the compositions are not achieved by such a conventional extruder.

SUMMARY OF THE INVENTION

Accordingly, one object of the present invention is to provide a process for preparing a thermoplastic resin composition, such as a hot melt composition, in which the components are uniformly blended.

Another object of the present invention is to provide an extruder for blending components of a thermoplastic resin composition.

These and other objects of the present invention have been attained by blending components of a thermoplastic resin composition in an extruder having a cylindrical body, a screw, and heating means, wherein the cylindrical body has a large bore part, a tapered part, and a small bore part, and the screw has a large diameter flight, a tapered flight, and a small diameter flight which is fitted within the clylindrical body. The tapered flight has free pass recesses, if desirable, and the roughness of the inner surface of the cylindrical body and/or roughness of the outer surface of the flight of screw are decreased as one proceeds in the direction from the small bore part to the outlet.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIGS. 4 and 5 are partially enlarged side views of the screw of FIG. 1;

FIGS. 6a and 6b are partial, cross-sectional views of a flight portion of the screw of FIG. 7 as denoted by the area III;

FIG. 7 is a cross-sectional view of the cooling structure of the screw;

FIGS. 8 and 9 are respectively, cross-sectional views of assembled apparatus of FIGS. 2 and 4 taken along the lines I—I and II—II of FIGS. 2 and 4, showing the free pass recesses of the flight of the screw;

FIG. 10 is a graph of the molten viscosity of the various hot melt compositions of temperatures a a function of the screw groove depth;

FIGS. 15(A) – 16(B) are plan and cross-sectional views showing various features of the flight of screw and the free pass recesses formed therein;

FIGS. 19 and 20 are cross-sectional views showing projecting parts of the flight of the screw;

FIG. 21 is a cross-sectional view of a screw having free pass recesses disposed about the periphery thereof; and FIGS. 22–24 are cross-sectional views of flights having free pass recesses of various configurations formed therein.

DETAILED DESCRIPTION OF THE ILLUSTRATED EMBODIMENTS

Suitable thermoplastic resin compositions prepared by the process of the present invention include various compositions, having a molten viscosity of 10 – 1,000,000 cps at 180° C, which comprise a thermoplastic resin, and other additives. The hot melt compositions can be prepared by blending principally a thermoplastic resin, a tackifier, a wax or asphalt, and if desired, a plasticizer, a non-adhesive resin, a pigment, or a filler. The compositions are solid at room temperature and are used by melting and re-solidifying, and the various hot melt compositions can be classified as follows:

HOT MELT ADHESIVE COMPOSITIONS:

Hot melt adhesive compositions are prepared by blending principally an ethylenevinylacetate copolymer, which exhances the initial adhesive and cohesive properties of the composition; a tackifier, which improves the adhesive properties and processibility of the composition; a wax which decreases the viscosity of the composition under molten conditions and prevents blocking; and if desired, a plasticizer which imparts bendability; a rubber; an antioxidant which prevents oxidation or deterioration of the composition at high temperatures; a pigment which adds a particular color to the composition; and other additives.

HOT MELT COATING COMPOSITIONS:

Suitable hot melt coating compositions are usually composed of ethylele-vinylacetate copolymers or rubbers, such as thermoplastic rubber, a wax, and if desired, a tackifier.

OTHERS:

Such compositions are composed of ethylene-vinylacetate and asphalt, and if desired, a tackifier, a plasticizer, a rubber, or a filler, and a portion or all of the ethylene-vinylacetate copolymer can be substituted by other thermoplastic resins. Suitable hot melt compositions contain 1 – 60 weight percent, and preferably 10 – 40 weight percent of an ethylene-vinylacetate copolymer and/or a rubber, 10 – 50 weight percent of a tackifier, 0 – 80 weight percent of a wax, 0 – 90 weight percent of an asphalt, and 0 – 60 weight percent of a filler.

Figure 1:
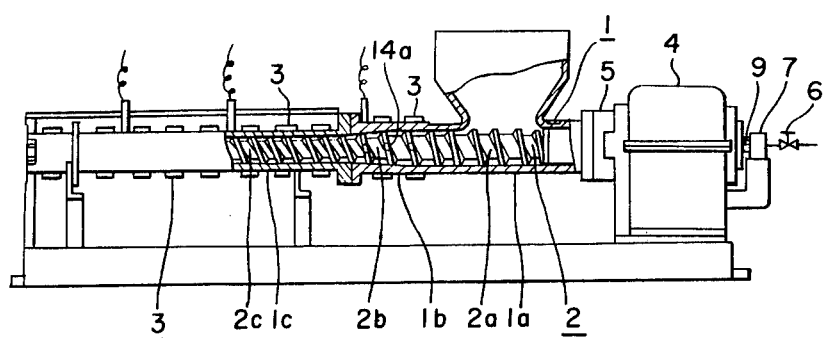
FIG. 1 is a side view, partly in cross-section, of an extruder constructed according to the present invention and showing its cooperative parts.

The components of the thermoplastic resin can be uniformly blended by passing free pass recesses formed on the tapered flight of a screw in a uniaxial extruder, the effect being achieved for example, with the following extruder. Referring now to the drawings, and more especially to FIGS. 1 – 7, the basic structure of the extruder of the present invention will be illustrated. FIG. 1 is a side view, partly in cross-section, of an extruder, constructed according to the present invention, which includes a cylindrical body 1 having a large bore 1a, a tapered bore portion 1b, and a small bore portion 1c.

A screw 2 is rotatably disposed within the cylindrical body 1 and the flight of the screw, corresponding to the inner surface of the cylindrical body 1, comprises a large diameter part 2a, a tapered part 2b, a small diameter part 2c, and an outlet measuring part 2d as seen in FIG. 5. A plurality of heaters 3 are provided on the outer surface of the cylindrical body 1 and are controlled by means of a temperature detector, not shown, provided on the cylindrical body 1 for each heater or group of heaters under a command signal. By this means, the temperature of the cylinder 1 is maintained at a predetermined value.

In the present invention, one of the characteristics of the hot melt compositions is that the same have a remarkable temperature dependency on viscosity, that is, a high heat sensitivity, and such may be attained within the extrusion blend produced by the extruder of the present invention.

The cylindrical body 1 is connected to a water cooling flange 5 provided at the end of a driving device 4, and a water coolant which cools the exterior of the screw, is fed from a valve 6 and through a rotary joint 7 to a water coolant feed pipe 9 which projects into a hollow part of the screw shaft. The driving device 4 is a geared motor, and it is additionally seen that the hot melt composition is fed into a hopper 10 which is respectively connected to the large bore portion of the cylindrical body 1.

The thermoplastic resin and other additives are fed into the device in the form of pellets or powders, and granules, and are mixed by means of the screw. The mixture is then heated by means of the heater, and the heat friction caused by the screw, so as to form a viscous semifluid which is blended and discharged, and in this instance, a back pressure flow is effectively created within the screw grooves by increasing the compression ratio so as to improve the degree of blending. In the structure of the invention, the free pass recesses 14a are formed upon the tapered flight 2b of the screw, and it is seen that the gas and the blend of the mixture are conducted through the recesses so as to alternately exchange positions therewithin so as to improve the blend.

Figure 2:
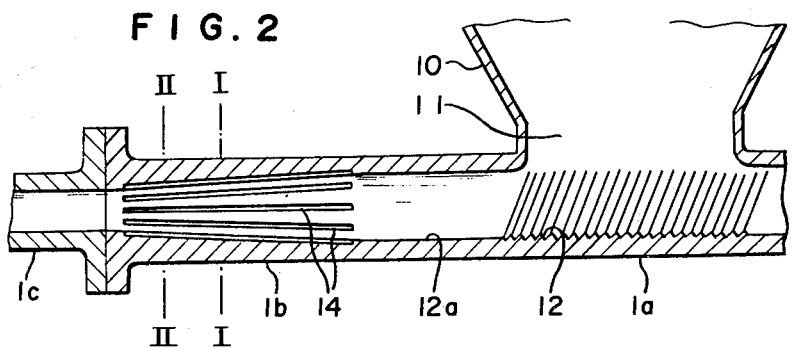
FIGS. 2 and 3 are partially enlarged cross-sectional views of the cylindrical body and hopper of FIG. 1.

As shown in FIG. 2, plural screw type grooves 12, whose screw direction is opposite that of the large diameter flight 2, are formed upon the portion of the inner surface of the large bore part 1a which axially corresponds to the hopper 10, and the inner surface portion 12a of the large bore adjacent to the screw type grooves 12 is processed, so as to be a rough surface, by, for example, a knurling process. When the plural screw type grooves 12 are also formed by a knurling process, the inner surface 12a of the cylindrical body adjacent to the grooved part is processed by a knurling process which knurls the same to a depth substantially less than that of grooves 12.

The inner surface of both the tapered part 1b or the large bore part 1a should have a lower degree of roughness as compared as compared with that of the grooved portion 12 of the cylindrical body, and the consideration of roughness can be based upon the surface roughness value $R_z$ according to Japanese Industrial Standard B 0601. The roughness of the inner surface of the small bore portion 1c of cylindrical body 1 is the same as the roughness of the portion of the tapered bore part 1b at the adjacent part 12a and is decreased in the direction of the outlet of the composition, and the degree of roughness of the screw 2 is preferably lower than the roughness of the corresponding inner surface of cylindrical body 1 so as to provide a difference in roughness therebetween.

Figure 3:
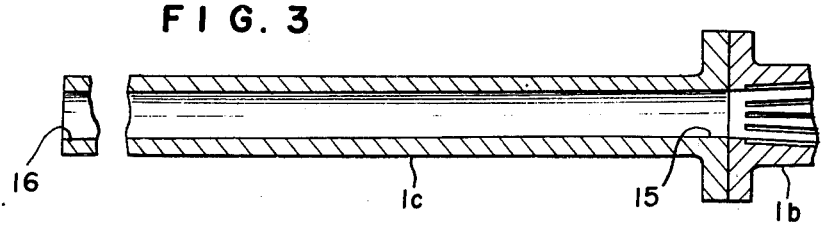

FIG. 3 is a partially enlarged cross-sectional view of the small bore part 1c which is connected to the tapered part 1b by means of flanges 15, an outlet 16 being connected thereto with means therewithin for controlling the extrusion rate.

Figure 4:
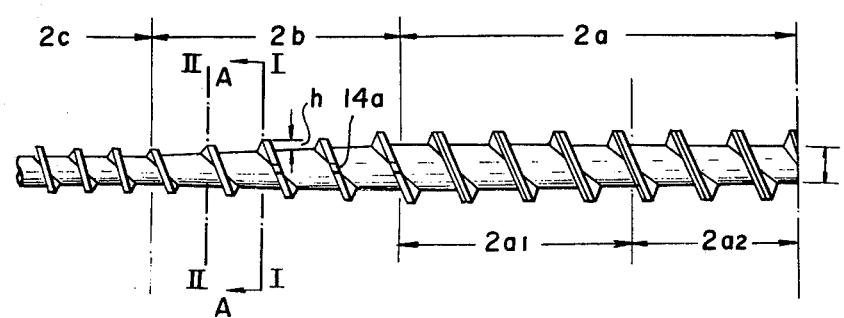

In FIG. 4, the screw 2 is rotatably fitted within the cylindrical body 1 and has the large diameter flight 2a, the tapered flight 2b and the small diameter flight 2c. The large diameter part 2a has a part $2a_2$ corresponding to the hopper 10 and a part $2a_1$ corresponding to the large bore part 1a. The flight of the screw has a height h, and the free pass recesses 14a are formed upon the tapered flight 2b.

In FIG. 5, the screw 2 is seen to comprise the small diameter flight 2c and the outlet part 2d, and FIGS. 6a and 6b disclose cross-sectional views of flights 17a and 17 of the screw 2.

In FIG. 7, a water coolant for cooling the screw from the interior part 8 thereof is fed through the rotary joint 7 and the water coolant feeding pipe 9, the hollow bore part 8 being formed from the driving device side to the outlet side of screw 2. The hollow part can be extruded to the end or the tapered part 2b or to the outlet part 2d and should be a blind bore, and a water coolant is fed at a desirable position in the hollow part 8 so as to control the temperature of the mixture in the cylindrical body, together with the heater 3.

Referring now to FIGS. 8 and 9, the feature of the free pass recesses 14a formed on only the tapered flight 2b so as to provide the high compression ratio will now be described, and in accordance with such feature, the longitudinal recesses 14 are also formed upon the inner surface of the cylindrical body in order to increase the biending effect. These recesses 14a can be formed not only upon the tapered part 1b, and tapered flight 2b, but also upon the other parts so as to properly conduct the gas and blended material, and the recesses can be formed in various ways. For example, a recess may be formed upon every other pitch, or alternatively, a recess may be formed upon each pitch for several serial pitches and not formed upon the next several pitches.

The depth of the screw grooves, or height of the flight, is decreased from the large bore part to the tapered part and the small bore part, and it is preferable to continuously decrease the depth of the screw grooves from the hopper to the outlet for the thermoplastic resin composition.

In accordance with the structure of the present invention, the tapered part 2b is formed whereby the back pressure flow of the mixture and the exchange of positions of the same and the gas, based on the variation of the compression ratio at the tapered part, can result even though the depth of the screw grooves is uniform, and when, in fact, the depth of the screw grooves at the tapered part is gradually decreased, a high compression ratio can be obtained at the tapered part, whereby the interchange of positions between the gas and the mixture can be remarkably improved.

The compression ratio in the large diameter flight 2a is in a range of 1.1 – 1.3 and that of the tapered fluid 2b is in the range of 2.5 – 3.5, while that of the small diameter flight is in a range of 1.8 – 2.8. The other feature of the present invention, concerning the structure of the inner surface of the cylindrical body, will be illustrated hereinafter.

In summary, the apparatus for preparing a thermoplastic resin composition, especially a hot melt composition, comprises a hopper; a cylindrical body having a large bore part, a tapered part, and a small bore part; a heating mechanism surrounding the cylindrical body; a screw which has a shape corresponding to the inner surface of the cylindrical body and is rotatable therewithin; a mechanism for cooling the screw from the interior part thereof; and wherein the roughness of the inner surface of the cylinder is different from the roughness of the surface of the screw.

The roughness of the inner surface of the cylindrical body is decreased as follows. The roughness of the inner surface of the tapered part or the small bore part is in a range of 100 – 32 of $R_z$, and the roughness of the inner surface of the small bore part at the outlet is in a range of 16 – 6.3 Z of $R_z$.

Similarly, the roughness of the outer surface of the screw is decreased as follows. The roughness of the outer surface of the large diameter flight is in a range of 100 – 32 Z of $R_z$, and the roughness of the outer surface of the tapered flight adjacent to the small diameter flight at the outlet end is in a range of 16 – 2.5 Z of $R_z$. However, the roughness of the outer surfaces of all of the flights can be a mirror surface in a range of 16 – 2.5 Z of $R_z$.

Within the extruder of the invention, the ratio of the depth of the free pass recesses to the height of the tapered flight is usually in a range of 0.2 – 0.9, and preferably within the range of 0.4 – 0.6. When it is less than 0.2, or more than 0.9, the blendability and gas vent at the free pass recesses are not enough to obtain uniform hot melt adhesive compositions and hot melt coating compositions.

The ratio of the area of the free pass recesses to the area of the tapered flight is usually in a range of 1 1 20%, and preferably within the range of 3 – 15%. When it is out of this range, the blendability and gas vent are not sufficient to obtain uniform hot melt adhesive compositions and hot melt coating compositions.

The vertical angle of the tapered part of the cylindrical body is usually in a range of 2° – 12° preferably within the range of 3° – 8°, and especially desirable within the range of 4° – 6°. When it is out of this range, the compression is too high or too low to obtain uniform hot melt adhesive compositions and hot melt coating compositions.

Similarly, the ratio of the diameter of the large bore part to the diameter of the small bore part is usually within a range of 1: 1.1 – 3.0, preferably within the range of 1: 1 – 2.5, and especially desirable to be within the range of 1: 1 – 1.5 which is dependent upon the tapered part. When it is out of the range, the effects of the invention are not attained.

When the molten mixture for the hot melt composition is passed through the tapered part of the cylindrical body, a part of the molten mixture is forwarded by means of the tapered flight of the screw, however, a part of the molten mixture is also fed back through the free pass recesses of the tapered flight and is highly blended in the space defined between the tapered part of the cylindrical body and the tapered flight of the screw. When the shape of the tapered flight is varied, the flow of the molten mixture in the space can be varied.

FIG. 10 shows one embodiment of the screw having screw grooves of specific depths. In order to impart a high extrusion force to the mixture in the cylindrical body, the screw having the depth of the screw grooves shown in FIG. 10 is quite effective.

Figure 11:
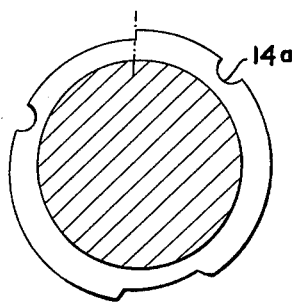
FIG. 11 is a cross-sectional view of the screw.

Referring now to FIGS. 11 – 24, there are shown various types of free pass recesses within the flight of the screw. In FIG. 11, two types of free pass recesses are formed within the peripheral part of the flights, that is, semicircular recesses, and an elongated, arcuate recess, and it is noted that the ratio of the area of the recesses to the area of the flight can be decided as desirable.

Figure 12:
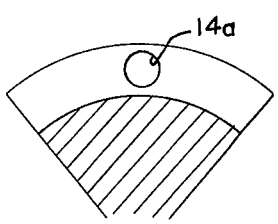
FIGS. 12 – 14 are cross-sectional views showing various configurations of the free pass recesses.

In FIG. 12, a circular hole recess is formed within the middle of the flight, and it is noted that the strength of the flight is greater than that portion thereof surroubding the recess, the flow of the molten mixture, by feeding back through the hole, being sometimes preferable.

Figure 13:
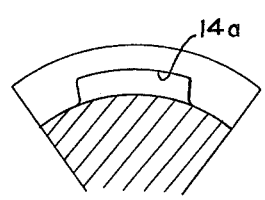
Figure 14:
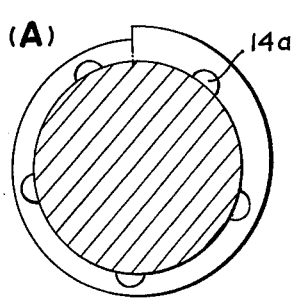
Figure 14:
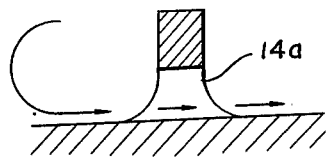
Figure 15:
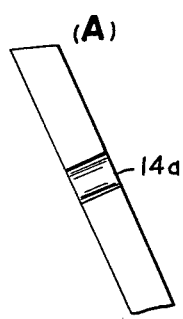
Figure 15:
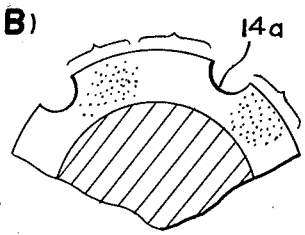
Figure 16:
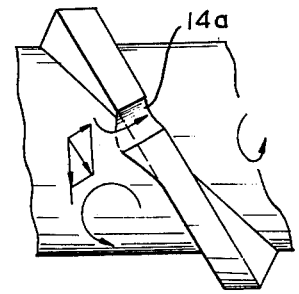
Figure 16:
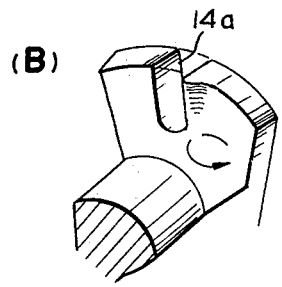

In FIG. 13, a rectangular recess is formed within the bottom portion of the flight, and the strength of the flight is similar to that of the embodiment of FIG. 12, the molten mixture at the bottom of the grooves of the screw being movable back through the rectangular recess.

In FIGS. 14(A) and 14(B), semicircular recesses are formed within the bottom of the flight so as to effect a special flow of the molten mixture, and the molten mixture at the bottom of the grooves of the screw can be moved by feeding back through the semicircular recesses as shown in FIG. 14(B).

In FIGS. 15(A) and 15(B), the roughness of the flight within the area disposed on the right side of a peripheral semicircular recess is different from the roughness of the flight within the area disposed on the left side thereof, and the flow of the molten mixture is modified by the difference of the roughness on the flight surface.

Figure 17:
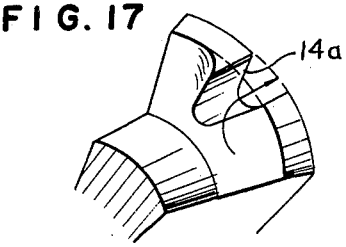
FIGS. 17 and 18 are perspective views showing other configurations of the free pass recesses.

In FIGS. 16(A) and 16B)B, a projecting edge is formed upon the flight portion disposed on the right side of the recess, and the rate of the molten mixture which is fed back through the peripheral, semicircular recess is increased and theflow of the molten mixture is modified. In FIG. 17, the projecting edge is formed upon the flight portion disposed on the left side of the recess, and the flow of the molten mixture is also modified thereby.

Figure 18:
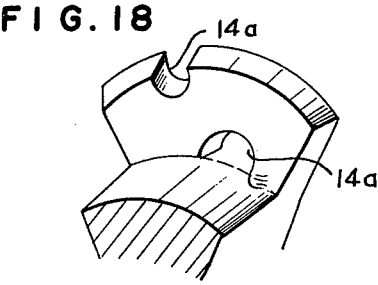

In FIG. 18, a semicircular recess if formed within the peripheral part of the flight, and a semicircular recess is also formed within the bottom portion of the flight, and the molten mixture is fed back through both the peripheral recess and the bottom recess, the flow of the molten mixture thereby being modified.

In FIG. 19, projections are formed upon the surfaces of the flights, and the flow of the molten mixture can be modified thereby. Still further, in FIG. 20, projections of a different configuration are formed upon the surfaces of the flights, and are effective for imparting an impelling force of high degree of the flow of the molten mixture.

In FIGS. 21 and 22, the angular spacing $\alpha$ for adjacent free pass recesses can be selected as desired, such as, for example, 120°, and it will be noted that the depth of the groove h or the height of the flight, at the left side is different from the depth of the groove at the right side of the flight because such is the tapered screw flight. In such a case, the depth of the free pass recess e can be decided with the above-mentioned range.

Referring back to FIG. 16(A), which is a side view of one pitch of the tapared screw flight, the flow of the molten mixture can be shown by the vector diagram therewithin. When a breaker plate or die is provided at the end of the screw for suppressing the flow of the molten mixture, a pressure gradient is formed in the cylindrical body so as to result in a back pressure flow which is directed opposite the extruding flow. The transversal flow is vertical to the side surface of the flight in accordance with the vector and is useful for kneading the molten mixture and transferring heat, the effects of the transversal flow thereof being quite important.

A high compression ratio is obtained at the tapered part of the apparatus and accordingly, the pressure difference between the pitches at the tapered part is high. Accordingly, when the free pass recesses are formed, the pressure at the screw groove on the outlet side is higher than the pressure at the screw groove on the inlet side, and the force of the transversal flow is also applied so as to move the molten mixture, the gas included in the molten mixture being conducted into the screw groove on the inlet side. The movement of the molten mixture is not constant, but intermittent, as a result of the effects of the back pressure of the molten mixture and the adjacent screw groove whereby the movement contributes to the kneading of the molten mixture. Accordingly, the shape of the free pass recess, and the area ratio of the free pass recess in one pitch, and the arrangement of the free pass recesses, that is, the pitch on the periphery of the flight, can be determined depending upon the properties of the molten mixture, such as, for example, its viscosity.

Certain embodiments thereof are shown in FIGS. 21–24, and it is noted that these matters, such as, for example, the shape of the free pass recess, are decided with skill in the art. The radius e of the semicircular free pass recess is within the range of 0.2 – 0.9, and preferably within the range of 0.5 – 0.9 times the height of the flight h at the position, and the number of free pass recesses on one pitch is usually 3–6. The aligned direction of the free pass recesses is preferably parallel to the transversal flow, however it is possible to be parallel to the axis of the screw.

FIGS. 23 and 24 show modifications of the free pass recesses, wherein either of the depths $e_1$ or $e_2$ is within the range of 0.2 – 0.9 h, and preferably within the range of 0.5 – 0.9 h. The angular extent $\beta_1$ or $\beta_2$ of the free pass recess with respect to the axis of the screw can be determined depending upon the length of the free pass recess on the flight and is approximately 30°.

Various embodiments of the free pass recesses have been illustrated within FIGS. 11–24, and a particularly desirable one can be selected and designed with particular skill in the art, since the flow of the molten mixture can be modified under feed-back conditions of the molten mixture through the free pass recesses formed upon the tapered flight of the screw. The configuration of the flight of the screw can also be a desirable one and typical configurations of the flight are shown in FIGS. 6a and 6b at 17a and 17.

In accordance with the process of the invention, the thermoplastic resin composition, especially the hot melt composition, can be easily prepared merely by passing the mixture of the components through the extruder so as to uniformly blend the components under the special flow characteristics of the mixture caused by the tapered part of the cylindrical body and the tapered flight of the screw, both of which comprise complementary free pass recesses. The difference in roughness between the inner surface of the cylindrical body and the outer surface of the screw, and the difference in the screw pitches, are also important features for the process for preparing the hot melt compositions.

Obviously, many modifications and variations of the present invention are possible in light of the above teachings. It is to be understood therefore that within the scope of the appended claims, the present invention may be practiced otherwise than as described herein.

We claim:

1. An extruder for extruding a thermoplastic resin composition, including a cylindrical body, a screw disposed within said body and heating means disposed about said body, the improvement which comprises:
    the cylindrical body has a large bore part, a tapered part, and a small bore part,
    the screw has a large diameter flight, a tapered flight, and a small diameter flight which is rotatably disposed within said cylindrical body, and
    a plurality of free pass recesses are formed upon said tapered flight.

2. The extruder according to claim 1, wherein:
    the ratio of the depth of the free pass recesses to the height of the tapered flight is in a range of 0.2 – 0.9.

3. The extruder according to claim 1, wherein:
    the ratio of the area of the free pass recesses to the area of the tapered flight is in a range of 1 – 20%.

4. The extruder according to claim 1, wherein:
    the ratio of the diameter of the large bore part to the diameter of the small bore part is in a range of 1 : 1.1 – 3.0.

5. The extruder according to claim 1, wherein:
    the vertical angle of the tapered part of the cylindrical body is in a range of 2°– 12°.

6. The extruder according to claim 1, wherein:

at least one longitudinal free pass groove is formed upon the inner surface of said tapered part of said cylindrical body.

7. The extruder according to claim 1, wherein:
the screw pitches of the screw in the tapered flight are larger than the screw pitches in the small diameter flight.

8. The extruder according to claim 1 further comprising:
means disposed at the outlet of said device for suppressing a flow of a molten mixture so as to impart compression in the small bore part, the tapered part, and the large bore part.

9. The extruder according to claim 1, wherein:
the roughness of the inner surface of the cylindrical body is different from the roughness of the surface of the screw.

10. The extruder according to claim 1, wherein:
the roughness of the inner surface of the cylindrical body is decreased from the large bore part to the small bore part.

11. The extruder according to claim 1, wherein:
plural screw type grooves, whose screw direction is opposite that of the large diameter flight, are formed upon the inner surface of said cylindrical body; and
a rough surface is formed by knurling on the inner surface of the large bore part of the cylindrical body.

12. The extruder according to claim 1, wherein:
the roughness of the inner surface of the tapered part adjacent to the small bore part is in a range of 100 − 32 Z of $R_z$; and
the roughness of the inner surface of the small bore part at the outlet is in a range of 16 − 6.3 Z of $R_z$, the roughness of the small bore part also being decreased in the flow direction.

13. A process for preparing a thermoplastic resin composition comprising a thermoplastic resin and additives, comprising:
uniformly blending the composition within an extruder having a cylindrical body, a screw disposed in said body and heating means disposed about said body,
the cylindrical body having a large bore part, a tapered part, and a small bore part, and the screw has a large diameter flight, a tapered flight, and a small diameter flight which is disposed within the cylindrical body, the tapered flight having free pass recesses; and
feeding back a part of the mixture through the free pass recesses.

14. The process for preparing a thermoplastic resin composition according to claim 13 wherein:
a mixture of components of a hot melt thermoplastic resin composition is blended by feeding back a part of the mixture through the free opening recess of the tapered flight of the screw.

15. The process for preparing a thermoplastic resin composition according to claim 13, wherein:
a mixture of components of a hot melt thermoplastic resin composition is forced from the large diameter flight through the tapered flight, and to the small diameter flight as a result of a variation in the roughness of the outer surface of the screw and/or the inner surface of the cylindrical body in the direction proceeding from the inlet to the outlet.

16. The process for preparing a thermoplastic resin composition according to claim 13, wherein:
a mixture of components of a hot melt thermoplastic resin composition is blended by feeding back a part of the mixture through the free opening recesses formed on the tapered flight and grooves formed on the tapered part of said cylindrical body.

* * * * *